(12) United States Patent
Querre

(10) Patent No.: US 8,640,050 B2
(45) Date of Patent: Jan. 28, 2014

(54) METHOD OF SELECTING ITEMS AND FUNCTIONS BY DISPLAYING A SPECIFIC ICON, AND DEVICE IMPLEMENTING THE METHOD

(75) Inventor: Goulven Querre, Noyal sur Vilaine (FR)

(73) Assignee: Thomson Licensing, Issy-les-Moulineaux (FR)

( * ) Notice: Subject to any disclaimer, the term of this patent is extended or adjusted under 35 U.S.C. 154(b) by 364 days.

(21) Appl. No.: 11/435,348

(22) Filed: May 16, 2006

(65) Prior Publication Data

US 2006/0262218 A1     Nov. 23, 2006

(30) Foreign Application Priority Data

May 19, 2005  (FR) ...................................... 05 51296

(51) Int. Cl.
*G06F 3/048* (2006.01)
(52) U.S. Cl.
USPC ............................ 715/829; 715/828; 715/825
(58) Field of Classification Search
USPC .................. 715/828, 825, 829, 786
See application file for complete search history.

(56) References Cited

U.S. PATENT DOCUMENTS

| | | | |
|---|---|---|---|
| 5,297,253 A | 3/1994 | Meisel et al. | |
| 5,353,219 A | 10/1994 | Mueller et al. | |
| 5,721,853 A | 2/1998 | Smith et al. | |
| 6,011,550 A | 1/2000 | Capps et al. | |
| 6,037,933 A * | 3/2000 | Blonstein et al. | 715/721 |
| 6,052,145 A * | 4/2000 | Macrae et al. | 725/50 |
| 6,381,637 B1 * | 4/2002 | Kamada | 709/218 |
| 6,678,891 B1 * | 1/2004 | Wilcox et al. | 725/42 |
| 6,766,526 B1 | 7/2004 | Ellis | |
| 7,010,756 B2 * | 3/2006 | Nagasaka et al. | 715/810 |
| 2001/0011991 A1 * | 8/2001 | Wang et al. | 345/156 |
| 2005/0235319 A1 * | 10/2005 | Carpenter et al. | 725/52 |
| 2006/0075327 A1 * | 4/2006 | Sriver | 715/501.1 |

FOREIGN PATENT DOCUMENTS

| | | |
|---|---|---|
| WO | WO 01/43424 A1 | 6/2001 |
| WO | WO 01/44896 A2 | 6/2001 |

OTHER PUBLICATIONS

Microsoft Coporation, Microsoft Windows XP—Start Menu (Selected Screen Captures), Aug. 6, 2004, Service Pack 2.*
Int'l Search Report Dec. 21, 1005.

* cited by examiner

*Primary Examiner* — Sara England
(74) *Attorney, Agent, or Firm* — Myers Wolin LLC

(57) ABSTRACT

A method enables selecting items from a list, as well as functions associated with these items and with the list in general. Each item is identified by an icon displayed in a series of icons. A first command enables the item to be selected and a second command enables it to be activated. The series of icons comprises at least one additional icon. The user selects this additional icon, then at the end of a certain time a sub-menu appears presenting all the functions selectable via the second command. With the second command, the user can execute functions that apply to the list of items and no longer to a single item. Also provided is a device capable of executing the method of selection and executing an item and a function.

10 Claims, 4 Drawing Sheets

METHOD OF SELECTING ITEMS AND FUNCTIONS BY DISPLAYING A SPECIFIC ICON, AND DEVICE IMPLEMENTING THE METHOD

This application claims the benefit, under 35 U.S.C. §119 of French Patent Application 05/51296, filed May 19, 2005.

FIELD OF THE INVENTION

The invention relates to a method of selecting items from a list displayed on a display screen and a device equipped with a user interface using the method.

BACKGROUND

A user interface (abbreviated to U.I.) is the combination of at least a means of receiving commands and at least a means of display. A U.I. generally uses descriptive data for preparing menus capable of being displayed on a television screen. Amongst other things, these data can be used to prepare lists of items that the user may select. The MPEG-7 standard specifies descriptive data associated with audiovisual contents. The MPEG-7 standard can be accessed via the ISO under the reference ISO/IEC JTC1/SC29/WG11-N5525 published in March 2003. If these data originate from a transmission network, they can be stored in a local database and continuously updated according to the contents transmitted by the network. There are other descriptive data, also read from media such as CDs or DVDs. Generally speaking, the descriptive data are recorded in a receiver memory database and grouped together by lists according to certain criteria such as: the titles of the programs transmitted, the transmission channels, the program topics, the available languages, etc. Other lists may also be prepared by the receiver itself, lists of functions for example.

Some lists are accessible with the aid of an Electronic Program Guide (abbreviated to EPG) displayed on a screen. The EPG retrieves list items from a transmission network for example and is responsible for displaying an item identifier in a box. The boxes are arranged vertically or horizontally, or in a grid. The user navigates the displayed lists with the aid of navigation keys arranged on a remote control. If the boxes are arranged horizontally, then the user navigates the list using the "right arrow" or "left arrow" keys. When a box is highlighted graphically, the item associated with this box is selected. Other keys can be used to execute functions applied to this item, for example if the item is an audiovisual program, the functions that can be executed may be viewing it, recording it or associating it with a text for example, etc. In some EPGs, the boxes associated with selectable items are spread over the screen, either within a structured list, or in isolation. The user may have difficulties in quickly selecting the item that they want since starting from a given item, the choice of navigation key to use is not clearly apparent to them.

The document WO01/43424—UNITED VIDEO PROPERTIES discloses the menu display forming lists arranged vertically. At the beginning and end of the list, icons accessible via navigation controls indicate that there are other items that would be displayed by continuing to navigate in this direction. For example, FIG. 28 and the corresponding text show the display of a favorite list, the display of a favorite list is triggered by selecting an icon in the icon field of FIG. 16. In FIG. 28, the icon that appears above an item list enables a sort function to be applied to the list below this icon. This document teaches access to a single set of functions from an additional icon.

The list displayed may comprise a large number of items. A well-known solution consists in using two page jumps forward and back keys. But this means having to increase the number of keys, which increases the cost of the remote control.

In addition to the functionalities that it provides, the remote control forms an important aesthetic element in an audiovisual system. According to fashion, they comprise more or less keys, and these keys take various forms. It may be useful to produce new forms of remote control with uncluttered lines and whose number or form of the keys arouses the user's interest.

The present invention discloses a new way of selecting an item within a list or a function, with limited and inexpensive means of receiving commands.

SUMMARY OF THE INVENTION

The object of the invention is a method of selecting items and functions, each item being identified by an icon displayed in a series of icons representing a sub-set of a list of items, comprising a stage of selecting an item by graphically highlighting its icon triggered by receiving a first command, a stage of executing a function applied to the item selected triggered by receiving a second command;
wherein it comprises:
a stage of displaying at least one additional icon identifying at least one function,
a stage of highlighting of said additional icon triggered by receiving a third command,
a stage of displaying and highlighting an identifier of one of said functions identified by the additional icon following a specified period during which no command is received, the execution of the function whose identifier is highlighted modifying the sub-set of displayed items.

In this way, the user can easily select an item and activate functions of different types with the aid of a remote control comprising a minimum number of keys. Thanks to the time delay, the user can have access to functions using the same navigation commands. In view of the reduced number of keys necessary for such operations, the user no longer needs to search for them on their remote control. They can thus navigate the displayed menus while watching the screen continuously, which is quicker and more efficient.

According to a first embodiment, the method comprises a stage of displaying a menu presenting a plurality of functions modifying the list of items. The display of this menu is triggered when the additional icon is highlighted and after the time delay. In this way, by selecting the additional icon, the user has access to new functions.

According to another embodiment, the method comprises a stage of executing a page jump triggered by a new command, accessible when an additional icon is highlighted and without there being any need to wait for the time delay. After the page jump has been carried out, the additional icon remains highlighted. In this way, the user performs page jumps by successively activating the second means of reception. According to one embodiment, the highlighted additional icon disappears when the end of the page is reached. In this way, the user sees immediately that they have reached one end of the list. According to another embodiment, two additional icons are displayed for performing page jumps backwards and forwards. The disappearance of one of the two additional icons when the end of list is reached triggers the highlighting of the other icon. In this way, the user can immediately start off again in the other direction from that in which he has just reached one end of the list.

According to another embodiment, the method automatically inserts an additional icon between a specified number of icons representing items. In this way, the user has additional icons here and there giving them access to additional functions for changing the list which they are navigating.

The invention also relates to an electronic device comprising a means for producing a signal for displaying a series of icons representing a sub-set of a list of items, each item being identified by a displayed icon, a means of receiving a command triggering the selection of an item by graphically highlighting the icon of the identified item and triggering the execution of a function applied only to the selected item; wherein it comprises a means for producing a signal for displaying at least one additional icon identifying at least one function, the means of receiving a command controlling the means of producing a display signal for highlighting, said additional icon and for displaying and highlighting an identifier of one of said functions identified by the additional icon following a specified period during which no command is received, the means of receiving a command also controlling a means of executing the function whose identifier is highlighted, said function modifying the sub-set of displayed items.

BRIEF DESCRIPTION OF THE DRAWINGS

Other characteristics and advantages of the invention will now appear in greater detail within the framework of the following description of examples of embodiment given by way of illustration with reference to the attached figures depicting.

DETAILED DESCRIPTION

Figure 1:
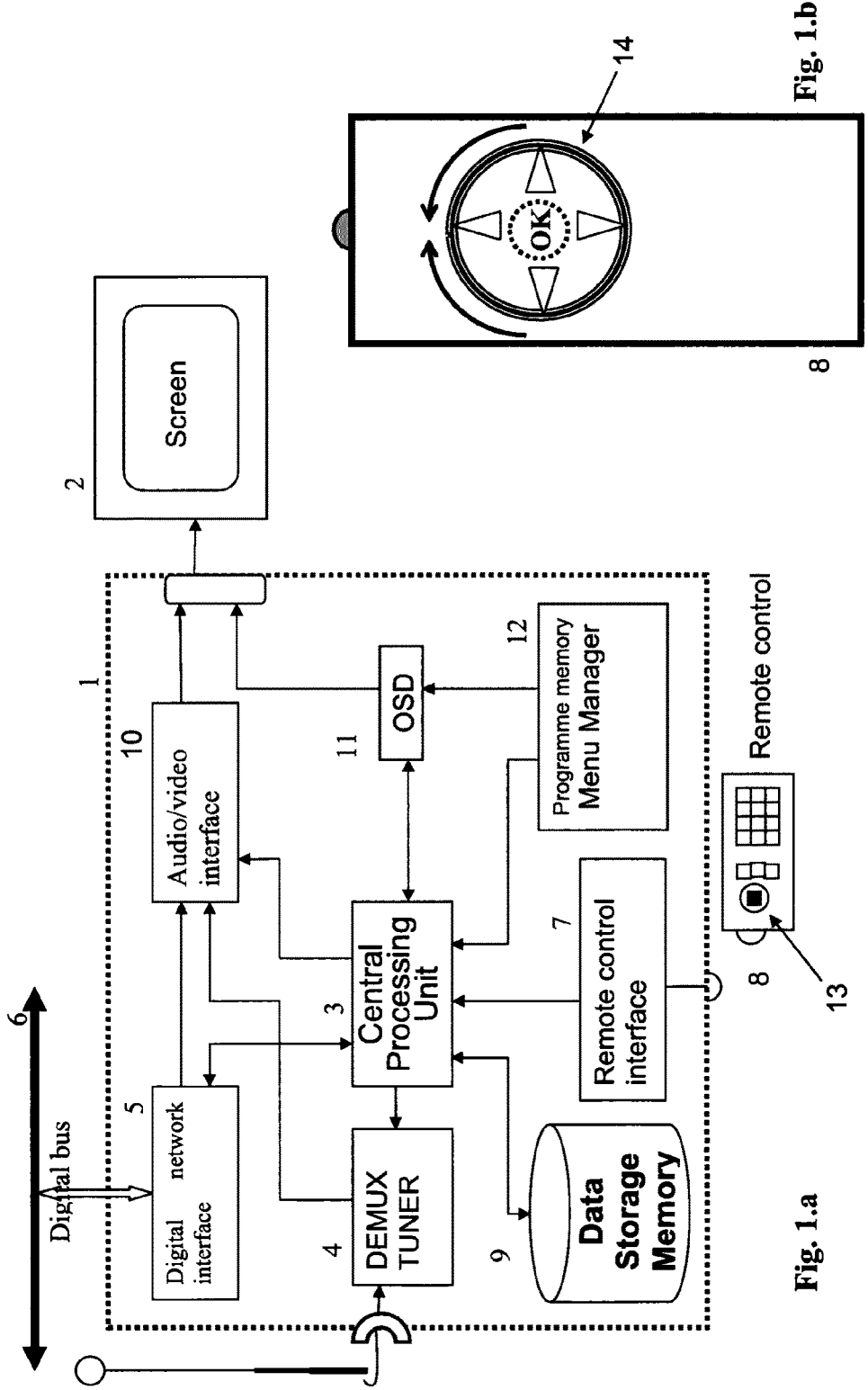
FIG. 1a is a block diagram of a viewing device for the implementation of an example of embodiment of the invention.
FIG. 1b shows a remote control according to a preferred example of embodiment of the present invention.

With the aid of FIG. 1.a, first of all disclosed is the structure of a multimedia receiver 1 equipped with a display device 2 according to one example of embodiment of the invention. The receiver is for example a decoder. Other devices can also be used for the present invention, for example a personal computer or a PVR, or any device capable of accessing audiovisual content and having means of creating and displaying menus. The receiver comprises a central processing unit 3 connected to a program memory 12, and an interface 5 for communicating with a high speed digital bus 6 for transmitting audio/video data in real time. This network is preferably public and can be used to access remote servers, the most common is the IP network. The receiver may also receive audio/video data from a broadcasting network via a receiving aerial associated with a demodulator 4. The receiver further comprises an infrared signal receiver 7 for receiving signals from a remote control 8, a storage memory 9 for storing audiovisual content and a database, and audio/video decoding logic 10 for generating audiovisual signals sent to the television screen 2. The remote control may be replaced by any means of receiving commands available on one of the sides of the device. The storage memory 9 is advantageously a hard disk of several hundred megabytes, for recording several hours at least of audiovisual content. This audiovisual content is identified by a title recorded in the database.

The remote control 8 comprises navigation keys: ←, ↑, →, ↓, and at least function keys such as "OK" and "LIST", and possibly a numeric pad for inserting a value. One variant, illustrated by the FIG. 1.b, consists in the remote control comprising a main key 14 endowed with several degrees of freedom of movement with possibly some additional keys. This main key 14 can turn left and right up to a maximum angle value, it can also be pressed. On its own, this key may replace keys such as ↑, ↓ and "OK".

FIG. 1b discloses a remote control 8 equipped with a single key 14 possessing seven degrees of freedom of movement. Such a button is disclosed in the patent application of the TELENOSTRA Company WO 02/31641. The key 14 can be pressed like a push-button, it can also be turned right and left like a rotary switch, and it can also be tilted upwards, downwards, right and left like a joystick. This enables a user to introduce at the most seven different commands. The "pressed" movement is advantageously assigned to the validation function, a screen-printed "OK" may be marked at the centre of key 14. It has proved that the aesthetic side of such a remote control has appealed to a large number of users. In addition, the reduced number of keys means that the user does not have to search for which to press and thus enables them to operate their remote control while still watching the screen.

The receiver 1 also comprises a circuit 11 for displaying data on the screen, often called an OSD circuit, from the English "On Screen Display". The OSD circuit 11 is a text and graphics generator enabling menus and pictograms (for example a number corresponding to the channel being viewed) to be displayed on the screen and which can be used to display navigation menus in accordance with the present invention, and especially one or more button bars. The OSD circuit 11 is controlled by the Central Processing Unit 3 and the menu manager 12. The menu manager 12 is advantageously produced in the form of a program module recorded in a read-only memory. It can also be produced in the form of a specialized circuit of the ASIC type for example.

The digital bus 6 and/or the transmission network transmit to the receiver data comprising multimedia content and data describing this content. These data originate either from a transmission network, or from the digital network 6. The descriptive data comprise classification elements called "attributes", of accessible multimedia content. The descriptive data are for example metadata defined according to the MPEG7 standard. These data are stored in the database of the receiver's storage memory 9 and are continually updated. The menu manager 12 extracts the information from this database and processes it to produce navigation menus displayed on the screen, especially one or more button bars.

According to a preferred example of embodiment, the menu manager 12 displays a list of items at the request of the user. The menu manager 12 can be integrated into an application such as an Electronic Program Guide (abbreviated to EPG). The function of the menu manager is to display lists of items and update them following the introduction of a command by the user.

Figure 2:
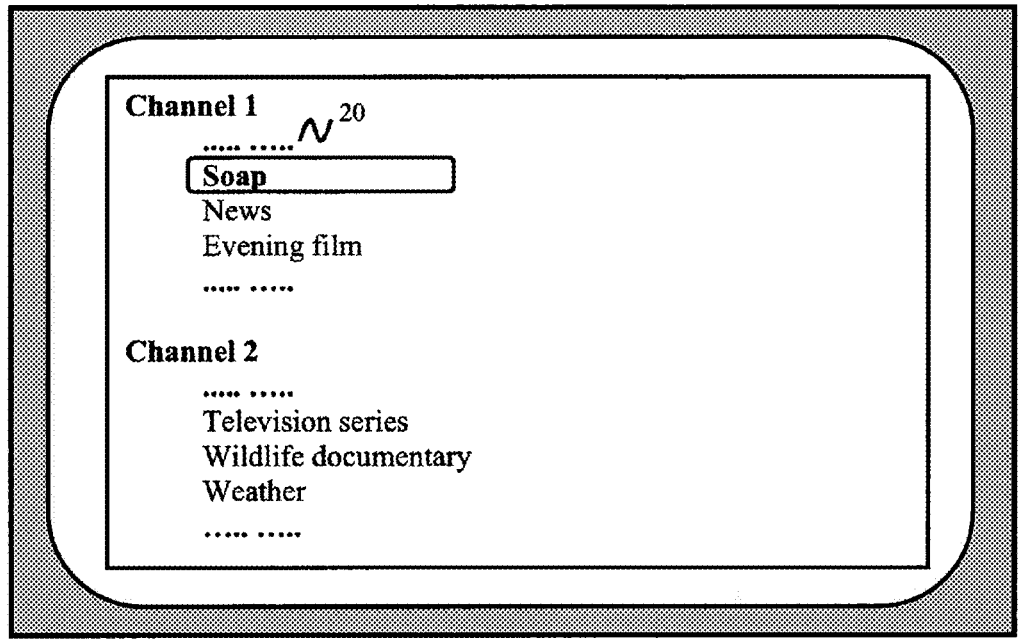
FIG. 2 shows an example of a screen shot including a list of items one of which is highlighted and WildCards.

FIG. 2 shows an example of a screen shot presenting a list of items, in the example a list of programs currently being transmitted. Each item is represented by an icon that identifies it, for example a box containing a title. The screen shot presents two pages of programs broadcast by two channels "Channel 1" and "Channel 2". In the example, the page comprises 3 titles. The icon representing the first program on the first page is highlighted by an outline. The first and last icons on the list of programs do not identify programs but form a selectable graphical element called a "WildCard" in English. In the example of FIG. 2, a WildCard 20 is represented by a series of dots. The presence of a WildCard 20 in a displayed list indicates to the user that this item is selectable and that selecting it gives them access to new functions.

Figure 3:
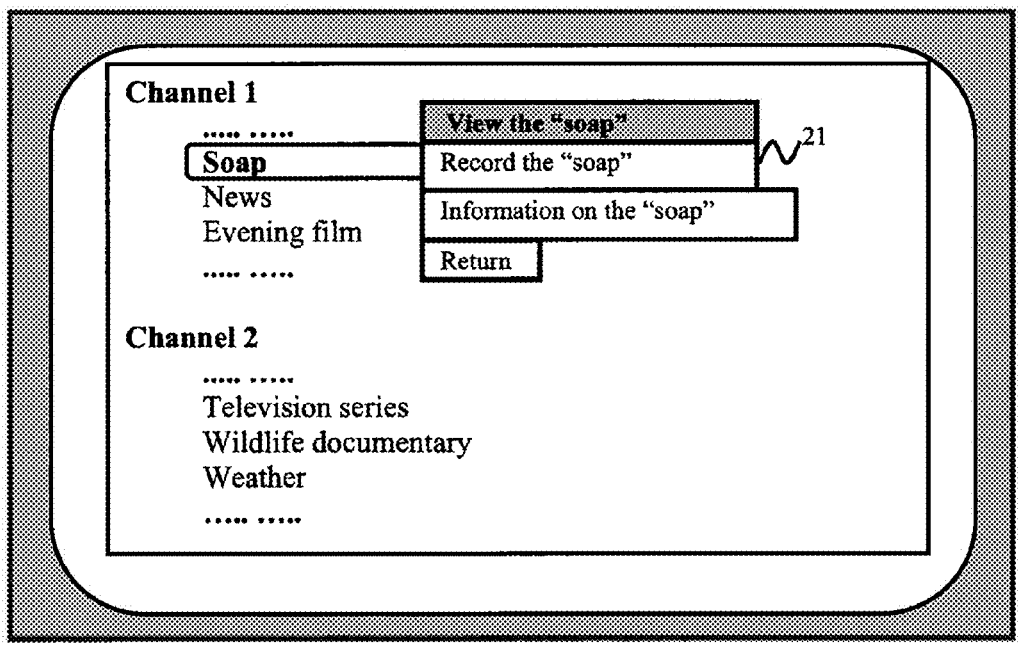
FIG. 3 shows an example of a screen shot including a list of items one of which is highlighted, WildCards and a sub-menu applied to the highlighted item.

First, let us assume that the user positions the focus on the first program of the first list and presses the OK key. This item is then regarded as activated which triggers its viewing. If it is a list of radio stations that is displayed, then activation triggers listening to the previously selected station. If it is a list of executable programs, activation causes the execution of the selected program. Generally speaking, any item in the list that is not an additional icon undergoes the processing that is appropriate to it, which does not affect the rest of the list. Advantageously, when the user remains for several seconds on an item, the list of executable actions on an item appears in a sub-menu 21, as shown in FIG. 3. For example, the menu reveals three actions: view, record, provide information on the selected item. Within this sub-menu 21, the user can navigate with the keys: ↑, ↓, and validate with the "OK" key thus triggering the execution of the selected action. If the user does not wish to launch any action, they move the focus into the last line marked "Return", which makes the menu disappear and recalls the screen shot as shown in FIG. 2.

Figure 4:
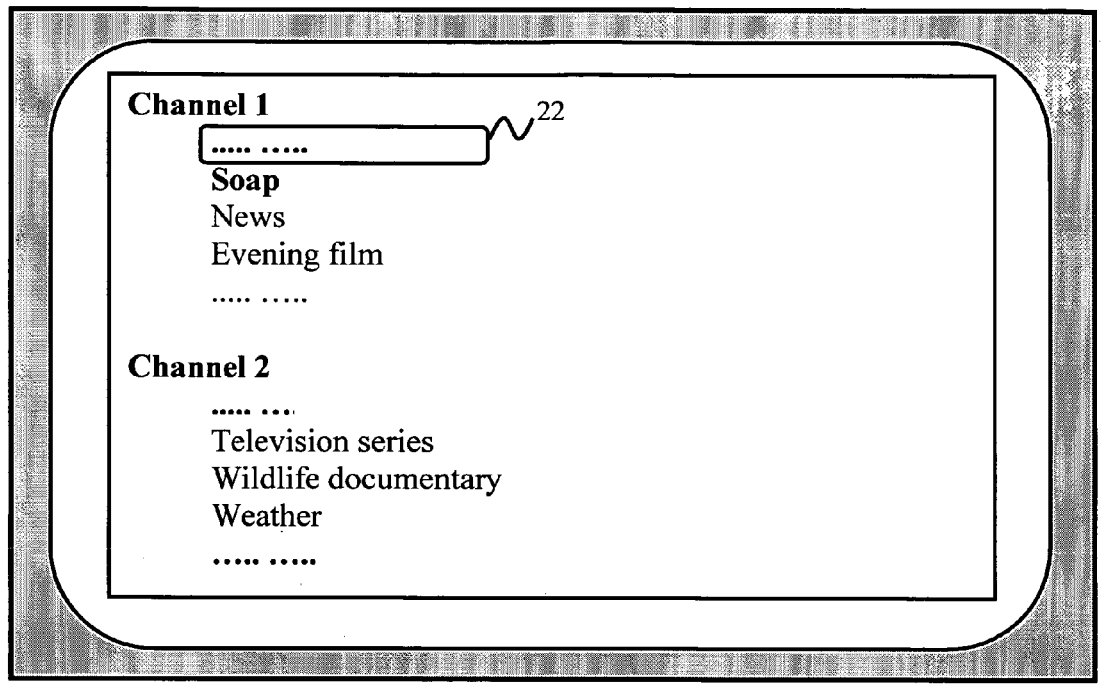
FIGS. 4 and 5 show two examples of a screen shot including a list of items and WildCards one of which is highlighted.
Figure 5:
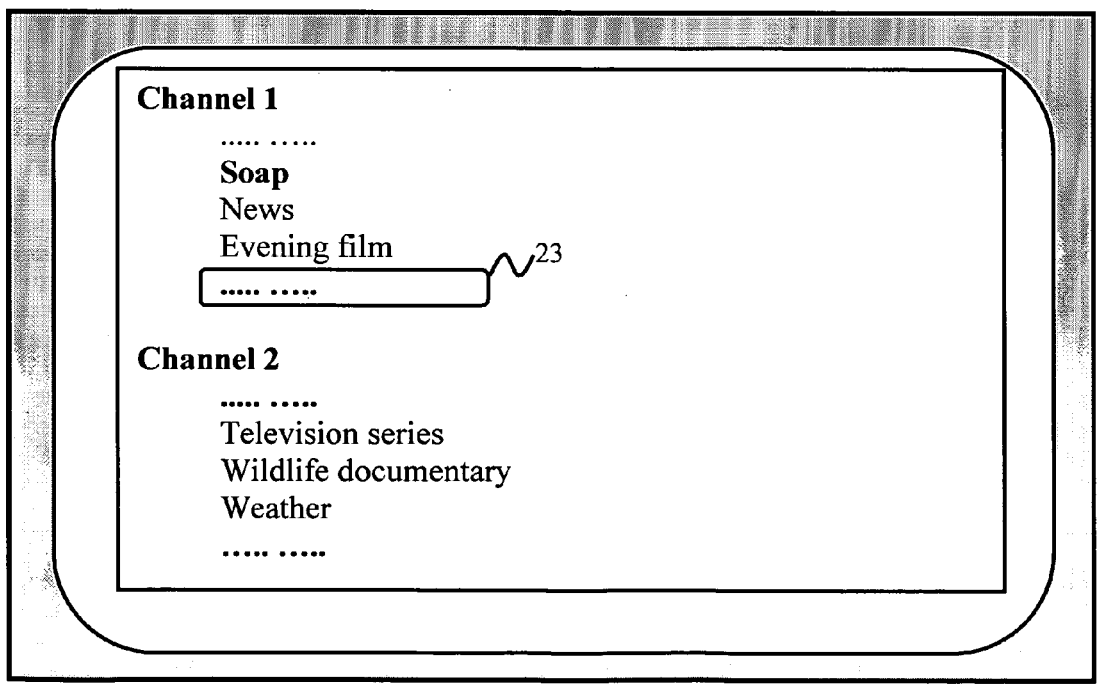

FIG. 4 shows an example of a screen shot where the user highlights the additional icon 20 at the top of the list. The functions accessible when an additional icon 20 is highlighted relate to the whole list. The first function consists in making a page jump, the three items in the displayed list are then replaced by the previous three items. The focus 22 remains on the additional icon at the top of the list, so that pressing again on "OK" displays another previous page. When the beginning of the list is reached, then the additional icon at the top of the list disappears, but not the additional icon at the bottom of the list on which the focus 20 may advantageously be positioned. As shown in FIG. 5, the user may also navigate downwards by placing the focus 23 on the additional icon at the bottom of the list. By successively pressing the "OK" key, the user scrolls through the pages to the end of the list of items, the focus 23 remaining on the additional icon at the bottom of the list.

Advantageously, when successively activating the additional icon at the top of the displayed list, the beginning of the item list is reached, then the additional icon at the top of the list disappears and the additional icon at the bottom of the list is automatically highlighted. In this way, the user can start off again at once searching in the other direction.

Figure 6:
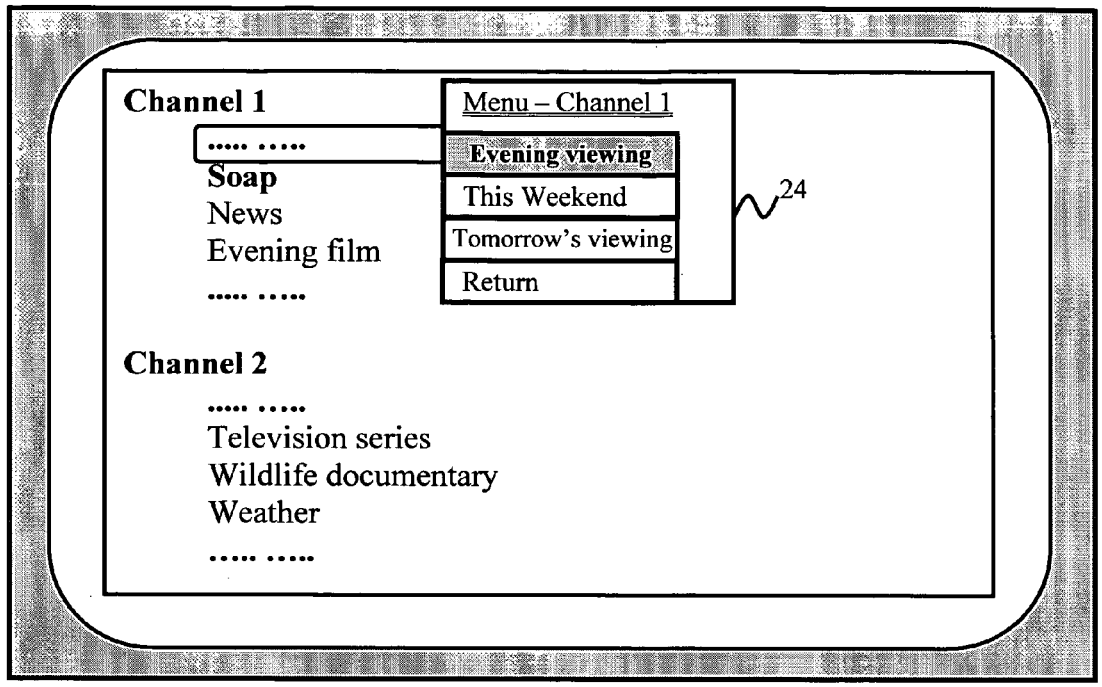
FIG. 6 shows an example of a screen shot including a list of items, WildCards one of which is highlighted, and a sub-menu associated with a highlighted WildCard.

Other functions are accessible from an additional icon. If the user presses "OK" immediately after highlighting the additional icon at the top of the sub-list, then a page jump is performed upwards. But if the user leaves the focus for a few seconds on an additional icon without operating any keys, a list of executable functions appears in a sub-menu 24, as shown in FIG. 6. For example, the sub-menu shows the items "This evening's viewing", "This Weekend" and "Tomorrow's viewing". These functions provide another list of programs transmitted by the same channel, giving access to programs that will be viewed later. Within this sub-menu 24, the user may navigate with the ↑, ↓ keys and validate with the "OK" key, which triggers the execution of the selected function and completely modifies the displayed sub-list. If finally the user does not wish to launch any function, they move the focus into the last line marked "Return", which makes the menu disappear and recalls the screen shot as shown in FIG. 4.

According to the preceding examples of embodiment illustrated in FIGS. 2 to 5, we see that the user can navigate, launch actions on the items or launch functions applicable to the list just using the key 13 endowed with at least three degrees of freedom of movement. The presence of an additional icon enables access to functions different from those accessible from the graphical identifier of an item in the list. In addition, according to the position of the additional icon within the displayed list, the accessible functions are not the same.

Figure 7:
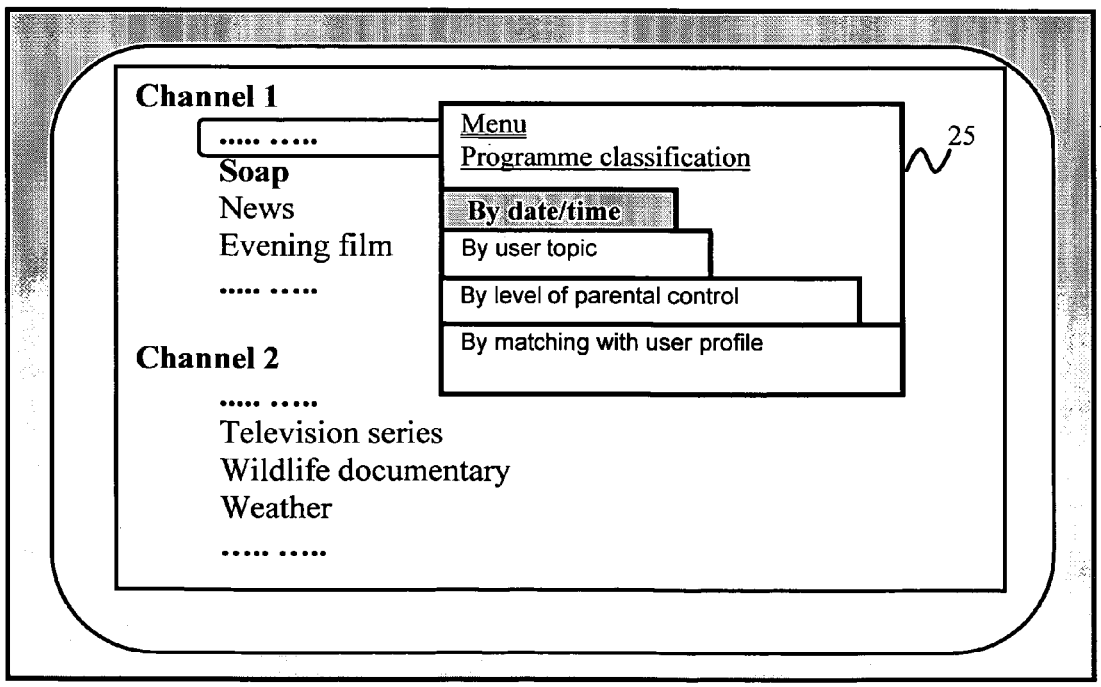
FIG. 7 shows another example of a screen shot including a list of items one of which is highlighted, WildCards and a sub-menu applied to the highlighted item accessible from a function key.

According to a variant, the remote control 8 has several function keys: "OK", "F1", "F2", . . . "Fi". According to whether the highlighted item is an additional icon or not, pressing the "Fi" key triggers a different effect. If a list item has the focus, pressing "OK" triggers its viewing, pressing F1 reveals the sub-menu in FIG. 3. If the additional icon at the top of the list has the focus, pressing "OK" triggers a page jump upwards, pressing F1 reveals the sub-menu in FIG. 6. Pressing F2 reveals the sub-menu 25 illustrated in FIG. 7. The sub-menu 25 can be used to reorganize the displayed list according to new criteria. Thus the list items can be sorted by date and time, by topic, by level of parental control, by user profile matching index, etc. A key Fi may advantageously execute the same command as the "Return" key, which makes the menu disappear and recalls the screen shot as shown in FIG. 5. The "Return" option is then no longer accessible via the sub-menus 24 and 25. Pressing another key Fi reveals a list of attributes for displaying a new list of programs corresponding to a selected attribute, for example the attribute selected is wildlife documentary and its activation triggers the display of the list of all the wildlife documentary programs transmitted on this channel.

According to one embodiment, an additional icon is not only placed at the beginning or end of the list, but may be positioned by the menu manager 12 at any place in the displayed list. If the displayed page comprises many items, it is preferable to insert an additional icon every 10 items for example. In this way, from any place on the page, the user only needs five navigation commands to reach an additional icon (either upwards or downwards) and thus have access to the additional functions provided by the additional icon.

According to the preceding examples, an additional icon is represented in the form of a series of dots. Other representations are possible, as for example a horizontal segment, an empty rectangle, or any other displayable symbol that the menu manager can graphically highlight. The form of an additional icon must be able to inform the user of the presence of a selectable item that will be capable of giving them access to additional functions.

Although the present invention has been disclosed with reference to the particular modes of embodiment illustrated, it is in no way limited by these modes of embodiment, but only by the attached claims. Other changes or modifications may be made by a person skilled in the art to the previously disclosed modes of embodiment, without leaving the framework of the present invention.

The invention claimed is:
1. Method of selecting items and functions from a list displayed on a display screen, each item being identified by an icon displayed in a series of icons representing a sub-set of a list of ordered items, comprising selecting an item triggered by receiving a first command to move a cursor so that the associated icon is graphically highlighted, executing a function applied to the item selected triggered by receiving a second command of validation;

displaying at least two additional icons, each of the additional icons being associated with a page jump function and at least one additional function concerning the displayed list set, each of the two additional icons being placed at each end of the sub-set of displayed items, highlighting one of said additional icons triggered by receiving a third command of moving the cursor, displaying and highlighting an identifier of at least one of said additional functions identified by the additional icon following a specified period during which no additional first, second, or third command is received, and receiving a fourth command before the end of the specified period during which no additional first, second, or third command is received, triggering the displaying of a new page containing the item of the start or the end of the list that is placed in the sub-set of displayed items at the location previously occupied by the highlighted additional icon, and also triggering the highlighting of the other additional icon that is placed at the other end of the sub-set of displayed items.

2. Method according to claim 1, wherein the method further comprises displaying a menu showing a plurality of functions modifying the sub-set of items.

3. Method according to claim 2, wherein the selected additional icon disappears when, after receiving a command, the item at one end of the list is selected.

4. Method according to claim 1 wherein, following the reception of the command of validation, the additional icon remains highlighted enabling a page jump to be made on receiving a new command of validation.

5. Method according to claim 4, wherein the selected additional icon disappears when, after receiving a command, the item at one end of the list is selected.

6. Method according to claim 1, wherein the selected additional icon disappears when, after receiving a command, the item at one end of the list is selected.

7. Method according to claim 1, wherein the displaying at least one additional icon identifying at least one function inserts an additional icon between a specified number of icons identifying the items.

8. Electronic device comprising a circuit for producing a signal for displaying a series of icons representing a sub-set of a list of ordered items, each item being identified by a displayed icon, a signal receiver for receiving a first command to move a cursor triggering the selection of an item by graphically highlighting the icon of the identified item and triggering the execution of a function applied only to the selected item;

the circuit is further for producing a signal for displaying at least two additional icons, each icons being associated with a page jump function and at least one additional function concerning the displayed list set, each of the two icons being placed at each end of the sub-set of displayed items, the signal receiver is further for receiving a second command to move a cursor controlling the circuit for producing a display signal for highlighting one of said additional icons, and for displaying and highlighting an identifier of one of said functions identified by the additional icons following a specified period during which no additional command is received, the signal receiver is further for receiving a command of validation for controlling a processor for executing the function whose identifier is highlighted, the signal receiver, when a validation command is received before the end of the specified period during which no additional command is received, triggering the display of a page containing the item of the start or the end of the list that is placed in the sub-set of displayed items at the location previously occupied by the highlighted additional icon, and the highlighting of the other additional icon that is placed at the other end of the sub-set of displayed items.

9. Electronic device according to claim 8; wherein the circuit for producing a display signal graphically maintains the additional icon highlighted after receiving the command, enabling a new page jump to be performed at each reception of a new command.

10. Electronic device according to claim 8; wherein the circuit for producing a display signal inserts an additional icon between a specified number of icons identifying the items.

* * * * *